Mar. 20, 1923.

N. J. SMITH.
FISHING REEL.
FILED FEB. 25, 1922.

1,448,947.

Inventor
Nicholls J. Smith

By Horace [illegible]
Attorney

Patented Mar. 20, 1923.

1,448,947

UNITED STATES PATENT OFFICE.

NICHOLLS J. SMITH, OF BAINBRIDGE, GEORGIA.

FISHING REEL.

Application filed February 25, 1922. Serial No. 539,334.

*To all whom it may concern:*

Be it known that I, NICHOLLS J. SMITH, a citizen of the United States, residing at Bainbridge, in the county of Decatur, State of Georgia, have invented certain new and useful Improvements in Fishing Reels; and I do hereby declare the following to be a full, clear, and exact description of the invention, such as will enable others skilled in the art to which it appertains to make and use the same.

This invention relates to fishing reels and particularly to that class known as level winding reels. The invention consists in the mounting of the guide block and the arrangement of its actuating mechanism so as to minimize friction. There is also provided means for automatically compensating for such wear as take place.

Figure 1:
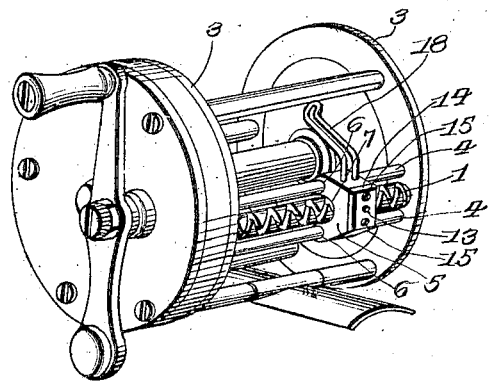
Figure 1 is a view in perspective of a fishing reel with my invention in place, showing method of mounting.
Figure 2:
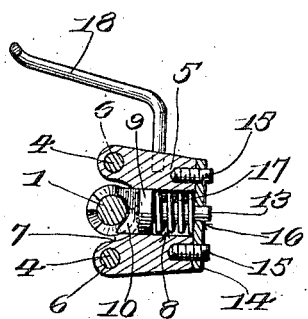
Figure 2 is an enlarged cross-section near the guide block taken on the line 2—2 of Figure 1.
Figure 3:
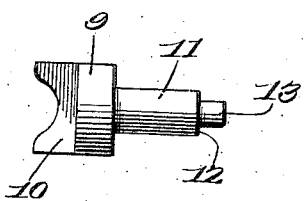
Figure 3 is an enlarged detail view, side elevation of the plunger or pawl.

Referring to the drawing 1 is a shaft having right and left hand spiral slots or grooves cut therein and reversing slots at each end connecting the spiral slots. Shaft 1 is rotatably mounted between the end plates 3—3, of the reel and has at its outer right hand end a pinion connected with the gear of the arm shaft and so with the spool to cause the shaft and spool to rotate in unison. Since this part of the mechanism is well known in the art and forms no part of this invention, it is not shown or described in detail. Rods 4—4 are connected between the end plates 3—3, one above and the other below shaft 1, and parallel therewith. The guide block 5 has holes 6—6, through which pass the rods 4—4, so that block 5, can slide back and forth thereon. Block 5 has a recess 7, formed in its inner face parallel with the holes 6—6, through which pass shaft 1. This recess is sufficiently large in diameter as to enable the inner face of the guide block 5 to entirely clear shaft 1.

Extending through block 5, from front to back, is the cylindrical opening 8. Fitted in this opening is the plunger or pawl 9. Projecting centrally across the inner face of the plunger or pawl 9 is the fin or blade 10, its inner edge is curved to conform to the curvature of shaft 1 at the bottom of slots 2. The shank 11, of the plunger or pawl 9, is stepped down in diameter to form a shoulder 12 and the pivoting end 13. A plate 14 covers the forward face of the guide block 5 and is attached thereto by screws 15—15. Plate 14 is provided with the centrally located hole 16, in which is seated the pivot end 13 of plunger or pawl 9. A spiral spring 17 bears against the under side of plate 14 and head of the pawl or plunger 9 and normally presses the fin or blade 10 into engagement with slots 2—2. From the top of block 5 projects the guide finger 18.

In practice the fishing line is led through the guide finger 18 and attached to the spool of the reel in the usual manner, and with the turning of the handle, shaft 1 is rotated and the fin or blade 10 by engaging the slots 2—2 is moved back and forth across the reel and this motion is imparted to the block 5 through the plunger or pawl head bearing against the walls of opening 8, of the guide block 5.

As the guide block 5 moves back and forth across the reel the line is wound smoothly and levelly on the spool. This motion of the guide block materially tends to cause the line to bear against the opposite side of the guide finger from that in whose direction the block is moving. Inasmuch as this guide finger is relatively long, considerable sidewise leverage is executed by the tension of the line and the guide block 5 has a tendency to twist on its lower bearing thereby causing the fin or blade of the plunger or pawl to bear with undue pressure on walls of the spiral slots and so wear away quickly. I have chosen to correct this twisting tendency by the two guide rods 4—4 mounted above and below the shaft 1. The guide block is thus supported by relatively long bearing surfaces which are located at diametrically opposed ends of the block and which therefore take the wear that would otherwise be transmitted to the thin and consequently quick wearing fin or blade. The mounting of the plunger or pawl horizontally instead of vertically and providing spring pressure for keeping it in engagement with the slots of shaft 1 is also new in this class of reels and provides an automatic means for taking up wear. This feature also enables me to retain the working parts in place by the easily detachable plate 14, which makes these parts readily accessible to the operator when renewal of parts is necessary.

Having fully described my invention what I claim as new and patentable is:—

What is claimed is:

1. In a level winding reel a spirally slotted shaft, guide rods mounted above and below said shaft, a guide block having holes bored at each end, through which pass said guide rods, a plunger or pawl fitted in said guide block from front to back, a fin formed on said plunger or pawl engaging the spiral slots of said shaft, a shank on said plunger, a plate covering the outer face of said guide block and having the other end of said plunger shank pivoted therein and a spring pressing said fin into engagement with the spiral slots of said shaft, as and for the purpose described.

2. In a level winding reel, a shaft having right and left hand spiral grooves rotatably mounted between the end plates of the reel, guide rods mounted above and below said shaft and parallel therewith, a guide block having holes bored at each end thereof from side to side, through which pass said guide rods, and having a recess formed in its inner face parallel with said holes to clear said shaft, a plunger or pawl fitted in the said block from front to back, said plunger or pawl having a fin or blade projecting from its inner face engaging the spiral slots of said shaft, and a shank formed on its outer end, said shank being reduced at its extreme outer end to form a pivot, a plate covering the outer face of said guide block, having a centrally located hole to receive the pivot end of said plunger or pawl, and a spring pressing said plunger or pawl into engagement with the slots of said shaft, as and for the purpose described.

3. The combination with a level winding reel provided with a rotatable shaft having right and left hand spiral grooves, of a guide block mounted for movement on the reel, said guide block carrying a pawl, said pawl having a fin projecting from one face and adapted to engage the spiral grooves of the shaft and having a shank projecting from its opposite face, said shank being reduced at its outer end to form a pivot, a plate covering the outer face of said guide block having a central opening to receive the pivot and a spring mounted for engagement with the pawl to hold it in contact with the shaft.

In testimony whereof, I affix my signature, in the presence of two witnesses:

NICHOLLS J. SMITH.

Witnesses:
J. M. VERUN,
M. L. SMITH.